(12) United States Patent
Sharma

(10) Patent No.: US 9,352,257 B2
(45) Date of Patent: *May 31, 2016

(54) INTERLOCK DEVICE

(71) Applicant: Donaldson Company, Inc., Minneapolis, MN (US)

(72) Inventor: Piyush Sharma, Valencia, CA (US)

(73) Assignee: Donaldson Company, Inc., Minneapolis, MN (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/755,938

(22) Filed: Jan. 31, 2013

(65) Prior Publication Data

US 2013/0193055 A1   Aug. 1, 2013

Related U.S. Application Data

(60) Provisional application No. 61/592,719, filed on Jan. 31, 2012.

(51) Int. Cl.
*B01D 29/11* (2006.01)
*B01D 29/21* (2006.01)
(Continued)

(52) U.S. Cl.
CPC ............... *B01D 35/30* (2013.01); *B01D 29/11* (2013.01); *B01D 29/96* (2013.01); *B01D 29/21* (2013.01); *B01D 2201/4015* (2013.01); *B01D 2201/4046* (2013.01)

(58) Field of Classification Search
CPC ........ B01D 29/11; B01D 29/13; B01D 29/15; B01D 29/31; B01D 29/33; B01D 29/35; B01D 29/96; B01D 35/30; B01D 35/306; B01D 2201/301; B01D 2201/302; B01D 2201/40; B01D 2201/4053; B01D 2201/4061; B01D 2201/4076; B01D 2201/4015; B01D 2201/4046; B01D 29/21
USPC .................................. 210/232, 236, 435, 450
See application file for complete search history.

(56) References Cited

U.S. PATENT DOCUMENTS 2,748,948 A    6/1956  Fricke et al.
4,806,240 A *  2/1989  Giordano et al. ............. 210/232
(Continued)

FOREIGN PATENT DOCUMENTS

DE    4201041      7/1993
EP    0681094     11/1995
(Continued)

OTHER PUBLICATIONS

"Extended EP Search Report," for European Application No. 11190932.1, mailed Jun. 1, 2012 (5 pages).
(Continued)

*Primary Examiner* — Joseph Drodge
(74) *Attorney, Agent, or Firm* — Pauly, DeVries Smith & Deffner LLC

(57) ABSTRACT

The current technology relates to an interlock device having a compression assembly and a fitting. The compression assembly has a first end, a second end, a locked position, and an unlocked position. A bayonet coupling defines the locked position of the compression assembly in a first position and defines the unlocked position of the compression assembly in a second position. A spring is compressibly disposed between the first compression assembly end and the second compression assembly end. The fitting is disposed on the second compression assembly end, and the fitting is configured to receive a filter receptacle. The compression assembly is configured to engage with a mating filter cartridge.

7 Claims, 13 Drawing Sheets

(51) Int. Cl.
 B01D 29/96 (2006.01)
 B01D 35/30 (2006.01)

(56) References Cited

U.S. PATENT DOCUMENTS

| | | | |
|---|---|---|---|
| 5,098,559 A | 3/1992 | Mack et al. | |
| 5,516,425 A | 5/1996 | Brieden et al. | |
| 5,643,446 A | 7/1997 | Clausen et al. | |
| 5,681,461 A | 10/1997 | Gullett et al. | |
| 5,695,633 A | 12/1997 | Ernst et al. | |
| 5,695,636 A | 12/1997 | Gullett | |
| 5,753,120 A | 5/1998 | Clausen et al. | |
| 5,762,788 A | 6/1998 | Gullett et al. | |
| 5,770,054 A | 6/1998 | Ardes | |
| 5,770,065 A | 6/1998 | Popoff et al. | |
| 5,814,215 A | 9/1998 | Bruss et al. | |
| 5,846,416 A | 12/1998 | Gullett | |
| 5,855,780 A | 1/1999 | Dye et al. | |
| 5,888,384 A | 3/1999 | Wiederhold et al. | |
| 5,902,479 A | 5/1999 | Fukumori et al. | |
| 6,015,492 A | 1/2000 | Popoff et al. | |
| 6,016,923 A | 1/2000 | Baumann | |
| 6,053,334 A | 4/2000 | Popoff et al. | |
| 6,113,781 A | 9/2000 | Popoff et al. | |
| 6,139,738 A * | 10/2000 | Maxwell | 210/248 |
| 6,171,491 B1 | 1/2001 | Popoff et al. | |
| 6,177,003 B1 | 1/2001 | Jainek et al. | |
| 6,217,763 B1 | 4/2001 | Lawrence et al. | |
| 6,235,194 B1 | 5/2001 | Jousset et al. | |
| 6,251,273 B1 | 6/2001 | Jawurek et al. | |
| 6,383,244 B1 | 5/2002 | Wake et al. | |
| 6,485,637 B2 | 11/2002 | Jainek et al. | |
| 6,488,845 B1 | 12/2002 | Neufeld et al. | |
| 6,495,042 B1 | 12/2002 | Knight et al. | |
| 6,506,303 B1 | 1/2003 | Gustafsson et al. | |
| 6,537,444 B2 * | 3/2003 | Wilberscheid | B01D 29/21 210/236 |
| 6,543,625 B1 | 4/2003 | Le Roux et al. | |
| 6,554,139 B1 | 4/2003 | Maxwell et al. | |
| 6,569,326 B1 | 5/2003 | Baumann et al. | |
| 6,572,768 B1 | 6/2003 | Cline et al. | |
| 6,607,665 B2 | 8/2003 | Fick et al. | |
| 6,635,175 B2 | 10/2003 | Stankowski et al. | |
| 6,679,990 B2 | 1/2004 | Reinhart et al. | |
| 6,685,829 B1 | 2/2004 | Baumann et al. | |
| 6,709,588 B2 | 3/2004 | Pavlin et al. | |
| 6,752,924 B2 | 6/2004 | Gustafson et al. | |
| 6,770,196 B2 | 8/2004 | Wall | |
| 6,790,356 B2 | 9/2004 | Wright et al. | |
| 6,797,168 B1 | 9/2004 | Knight et al. | |
| 6,811,694 B2 | 11/2004 | Jainek et al. | |
| 6,814,243 B2 | 11/2004 | Amstutz et al. | |
| 6,837,993 B2 | 1/2005 | Clausen et al. | |
| 6,872,304 B1 | 3/2005 | Gebert et al. | |
| 6,896,803 B2 | 5/2005 | Cline et al. | |
| 6,921,479 B2 | 7/2005 | Ardes et al. | |
| 6,926,156 B2 | 8/2005 | Wall et al. | |
| 6,926,825 B2 | 8/2005 | Ardes et al. | |
| 6,936,161 B2 | 8/2005 | Wright et al. | |
| 6,949,182 B2 | 9/2005 | Yano et al. | |
| 6,983,851 B2 | 1/2006 | Maxwell et al. | |
| 6,986,426 B2 | 1/2006 | Clausen et al. | |
| 6,994,796 B2 | 2/2006 | Wall et al. | |
| 7,033,502 B2 | 4/2006 | Engelhard et al. | |
| 7,086,537 B2 | 8/2006 | Maxwell et al. | |
| 7,163,623 B2 | 1/2007 | Knight et al. | |
| 7,204,370 B2 | 4/2007 | Clausen et al. | |
| 7,326,342 B2 | 2/2008 | Richmond et al. | |
| 7,360,658 B2 | 4/2008 | Clausen et al. | |
| 7,390,407 B2 | 6/2008 | Weindorf et al. | |
| 7,862,717 B2 | 1/2011 | Pfitzer et al. | |
| 8,128,817 B2 | 3/2012 | Roesgen et al. | |
| 8,999,163 B2 | 4/2015 | Honermann et al. | |
| 2002/0170279 A1 | 11/2002 | Gustafson et al. | |
| 2004/0159600 A1 | 8/2004 | Stankowski et al. | |
| 2004/0182777 A1 | 9/2004 | Stankowski et al. | |
| 2005/0035053 A1 | 2/2005 | Engelhard et al. | |
| 2005/0178714 A1 * | 8/2005 | Stockbower | 210/437 |
| 2006/0006124 A1 | 1/2006 | Yates et al. | |
| 2006/0054547 A1 | 3/2006 | Richmond et al. | |
| 2007/0039864 A1 | 2/2007 | Dworatzek et al. | |
| 2007/0215561 A1 | 9/2007 | Yates et al. | |
| 2007/0267338 A1 | 11/2007 | Menez et al. | |
| 2008/0053884 A1 * | 3/2008 | Marshall et al. | 210/232 |
| 2008/0169233 A1 | 7/2008 | Pfitzer et al. | |
| 2008/0245719 A1 * | 10/2008 | Beard et al. | 210/235 |
| 2009/0236271 A1 * | 9/2009 | Eserkaln | C02F 9/005 210/137 |
| 2010/0044295 A1 | 2/2010 | Honermann et al. | |
| 2010/0089813 A1 * | 4/2010 | Tellier et al. | 210/236 |
| 2010/0155321 A1 | 6/2010 | Sasur et al. | |
| 2011/0303600 A1 * | 12/2011 | Honermann et al. | 210/236 |
| 2013/0193057 A1 | 8/2013 | Honermann et al. | |
| 2014/0360929 A1 | 12/2014 | Vargas De Avila | |

FOREIGN PATENT DOCUMENTS

| | | |
|---|---|---|
| EP | 1008375 | 6/2000 |
| EP | 1031367 | 8/2000 |
| EP | 1110590 | 6/2001 |
| EP | 1419809 | 5/2004 |
| EP | 1623749 | 2/2006 |
| EP | 1714688 | 10/2006 |
| EP | 2091626 | 12/2011 |
| GB | 615250 | 1/1949 |
| JP | 2003320206 | 11/2003 |
| WO | 0009238 | 2/2000 |
| WO | 02070869 | 9/2002 |
| WO | 03080215 | 10/2003 |
| WO | 2004069373 | 8/2004 |
| WO | 2005087346 | 9/2005 |
| WO | 2008134494 | 11/2008 |
| WO | 2009132291 | 10/2009 |
| WO | 2011056857 | 5/2011 |
| WO | 2014197796 | 12/2014 |

OTHER PUBLICATIONS

"International Search Report and Written Opinion," for PCT Application No. PT/US2014/041305, mailed on Dec. 11, 2014 (10 pages).
"Reservoir Fill, Filter Manifold Assembly," Western Filter Corp. 1987, 1 page.
"International Preliminary Report on Patentability," for PCT/US2014/041305 mailed Dec. 17, 2015 (8 pages).

* cited by examiner

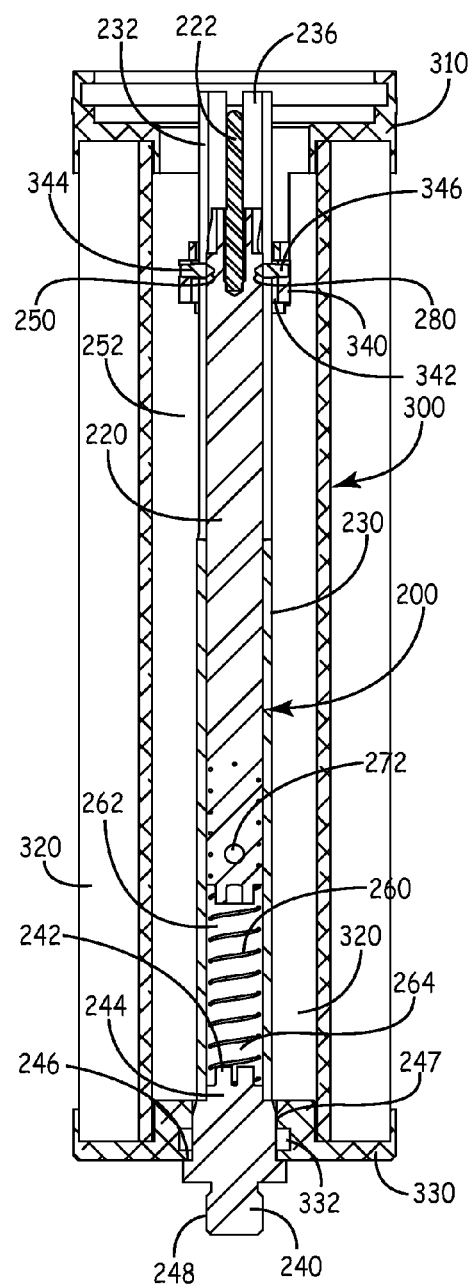
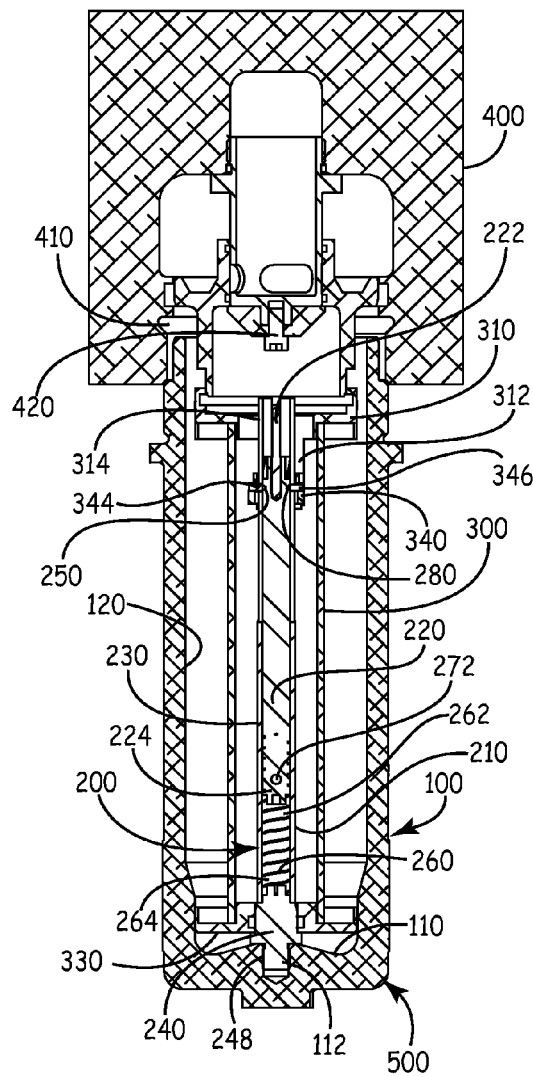
FIG. 15
FIG. 16

INTERLOCK DEVICE

This application is a non-provisional application claiming priority to U.S. Provisional Application No. 61/592,719, filed Jan. 31, 2012, and the entire contents of the U.S. Provisional Application are incorporated herein by reference.

FIELD OF THE INVENTION

This disclosure relates to filtration assemblies and methods. In particular, this disclosure relates to an interlock device for a filtration assembly.

BACKGROUND

Filters are commonly used in connection with lubrication systems and fuel systems for internal combustion engines, and hydraulic systems for heavy-duty equipment. Filters are also used in many other types of liquid systems. In these types of systems, the filter is changed periodically. In the art, there are at least two standard types of filters used. One type is a spin-on canister filter, while the other is a bowl-cartridge filter.

Bowl-cartridge filters typically include a reusable bowl holding a replaceable filter element (filter cartridge). Bowl-cartridge filters are sometimes preferred instead of spin-on canister filters due to disposal or other issues. Bowl-cartridge filters are mounted onto a filter head, and liquid to be cleaned passes through the filter head, into the bowl, through the replaceable filter cartridge, out of the bowl, and back into the filter head. After a period of use, the bowl-cartridge filter is removed from the filter head, and the replaceable filter cartridge is removed from the reusable bowl. The old filter cartridge is discarded and replaced with a new filter cartridge. The new filter cartridge is operably-mounted into the reusable bowl to provide a refurbished bowl-cartridge filter. This refurbished bowl-cartridge filter, containing the new filter cartridge, is then mounted onto the filter head.

Some problems with existing arrangements include the possibility of forgetting to replace the filter cartridge after removing the old filter cartridge. That is, after removing the old filter cartridge for servicing, it can be possible to replace the bowl back onto the filter head without operably inserting a new filter cartridge. This can lead to consequences for the equipment that needs the filtration. Furthermore, when there are multiple filter assemblies within close proximity of each other on one system, sometimes on a common filter head, the person servicing the filters can sometimes get mixed-up regarding which filter assembly goes on where.

SUMMARY OF THE INVENTION

The technology described herein relates to an interlock device coupled to a filter receptacle, wherein the interlock device has a first device end, a second device end, a rod, a sleeve and a fitting. At least a portion of the sleeve is disposed over at least a portion of the rod and at least one of the rod and the sleeve is rotatable relative to the other of the rod and the sleeve. A bayonet coupling releasably couples the rod relative to the sleeve. The rod and the sleeve mutually define at least a first key pathway, where at least a portion of the key pathway is non-longitudinal. The fitting is on the second device end and coupled to the end surface of the filter receptacle.

In another embodiment, an interlock device has a rod with a first rod end and a second rod end and a sleeve having a first sleeve end and a second sleeve end. The sleeve is at least partially disposed over at least a portion of the rod and at least one of the rod and the sleeve is rotatable relative to the other of the rod and the sleeve. A bayonet coupling releasably couples the rod relative to the sleeve, and a first key pathway is mutually defined by the rod and the sleeve. At least a portion of the key pathway is non-longitudinal. A fitting of the interlock device is configured to receive a filter receptacle.

In another embodiment an interlock device has a compression assembly and a fitting. The compression device has a first end, a second end, a locked position, and an unlocked position. A bayonet coupling defines the locked position of the compression assembly in a first position and defines the unlocked position of the compression assembly in a second position. A spring is compressibly disposed between the first compression assembly end and the second compression assembly end. The fitting is disposed on the second compression assembly end, and the fitting is configured to receive a filter receptacle. The compression assembly is configured to engage with a mating filter cartridge.

In yet another embodiment, a filter cartridge has a tubular construction of filter media defining a cylindrical open filter interior coupled to a first end cap on its first end and a second end cap on its second end. The first end cap has an extension portion that projects toward the second end cap and into the cylindrical open filter interior defined by the filter media. A key coupled to the extension portion and the key is rotatable relative to the extension portion. The key is configured to engage a filter receptacle assembly.

BRIEF DESCRIPTION OF THE DRAWINGS

The invention may be more completely understood and appreciated in consideration of the following detailed description of various embodiments of the invention in connection with the accompanying drawings.

FIG. 15 depicts a cross sectional view of a filter assembly and an interlock device, consistent with the technology disclosed herein.

FIG. 16 depicts a cross-sectional view of the example implementation of FIG. 1, prior to filter installation.

DETAILED DESCRIPTION

The interlock device consistent with the current technology can be relevant to a variety of areas for implementation, and prevents the installation of a filter assembly to a filter head unless a filter cartridge is properly installed therein. The interlock device has a locked and unlocked position, and is generally locked until an appropriate filter cartridge is installed in the filter receptacle assembly and over the interlock device. In the locked position, the interlock device mechanically interferes with the coupling of the filter head to the filter receptacle and prevents installation of a filter cartridge. In the unlocked position, the interlock device allows installation of the filter cartridge in the filter receptacle and additionally allows installation of the filter receptacle—holding the appropriate filter cartridge—to the filter head.

An engagement structure of the filter cartridge unlocks the interlock device, allowing installation of the filter cartridge in the filter receptacle. The engagement structure of the filter cartridge also unlocks the interlock device to allow compression of the interlock device, which prevents the mechanical interference between the interlock device and the filter head. As such, the filter assembly can be installed in the filter head.

Figure 1A:
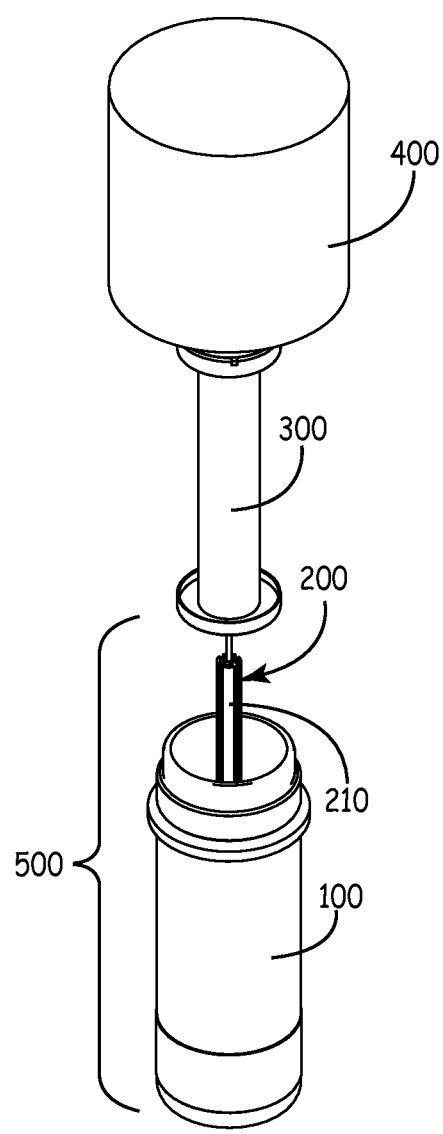
FIG. 1A depicts an exploded perspective view of an interlock device in an example implementation.
Figure 1B:
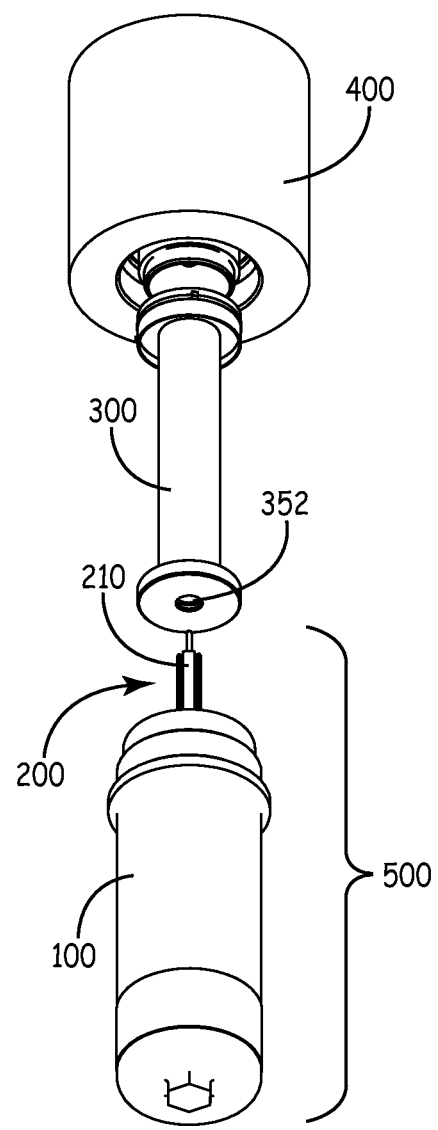
FIG. 1B depicts an exploded perspective view of the interlock device in the example implementation of FIG. 1A.

FIGS. 1A and 1B depict exploded perspective views of an interlock device in such an example implementation, which is a liquid filter application. An interlock device 200 having a compression assembly 210 (described in more detail, elsewhere herein) is coupled to the end surface of a filter receptacle 100. A filter cartridge 300 is installed in the filter receptacle assembly 500 and over the interlock device 200, such that a open filter interior 352 defined by the filter cartridge accommodates at least a portion of the interlock device 200. In FIGS. 1A and 1B, the filter cartridge 300 is shown without the filter media to simplify the drawing. The filter cartridge 300 is then longitudinally translated along the interlock device 200 towards the end surface of the filter receptacle 100. An engagement structure on the filter cartridge 300 unlocks the interlock device 200 upon installation, which allows compression of the compression assembly 210 from a first, extended position to a second, compressed position. The filter receptacle assembly 500 holding the filter cartridge 300 is then coupled to a filter head 400 consistently with what is generally known in the art.

In many embodiments, as the filter cartridge is installed in the filter receptacle assembly, the compression assembly 210 is manually compressed and engaged in the compressed position, described in more detail, below. In another embodiment, the act of coupling the filter receptacle assembly 500 to the filter head 400 actively compresses the compression assembly 210 to its compressed length. In yet another embodiment, a combination of the two approaches can be used, where manual compression is used to initially compress the compression assembly 210 to an intermediate length, and the installation of the filter cartridge assembly 500 to the filter head 400 further compresses the compression assembly 210 to its compressed length.

Without installation of the filter cartridge 300 in the filter receptacle assembly 500, the compression assembly 210 remains in a rigid, extended position, in which the compression assembly 210 mechanically interferes with the filter head 400 to prevent coupling of the filter head 400 and the filter receptacle assembly 500. This interference also occurs upon the installation of an incorrect filter cartridge in the filter cartridge assembly 500, because an incorrect filter cartridge does not define the appropriate configuration to unlock the interlock device 200, which will be described in more detail. This can prevent risks associated with installing filter cartridges that are unsuited for particular filter receptacles.

Interlock Device

Figure 2:
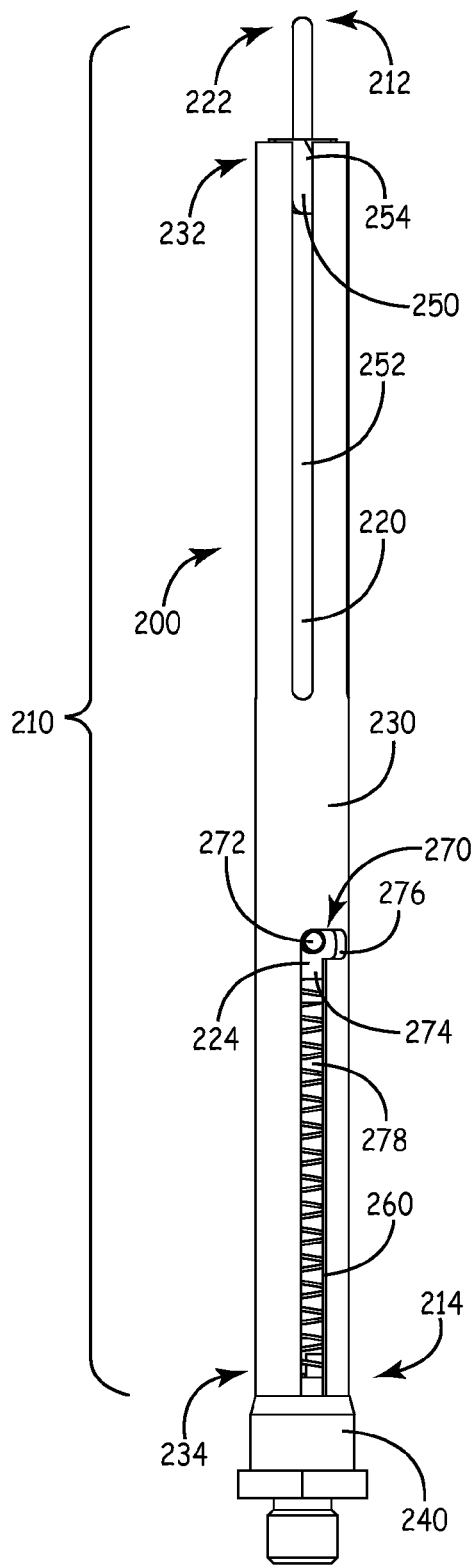
FIG. 2 depicts a front view of an example interlock device consistent with the technology disclosed herein.
Figure 3:
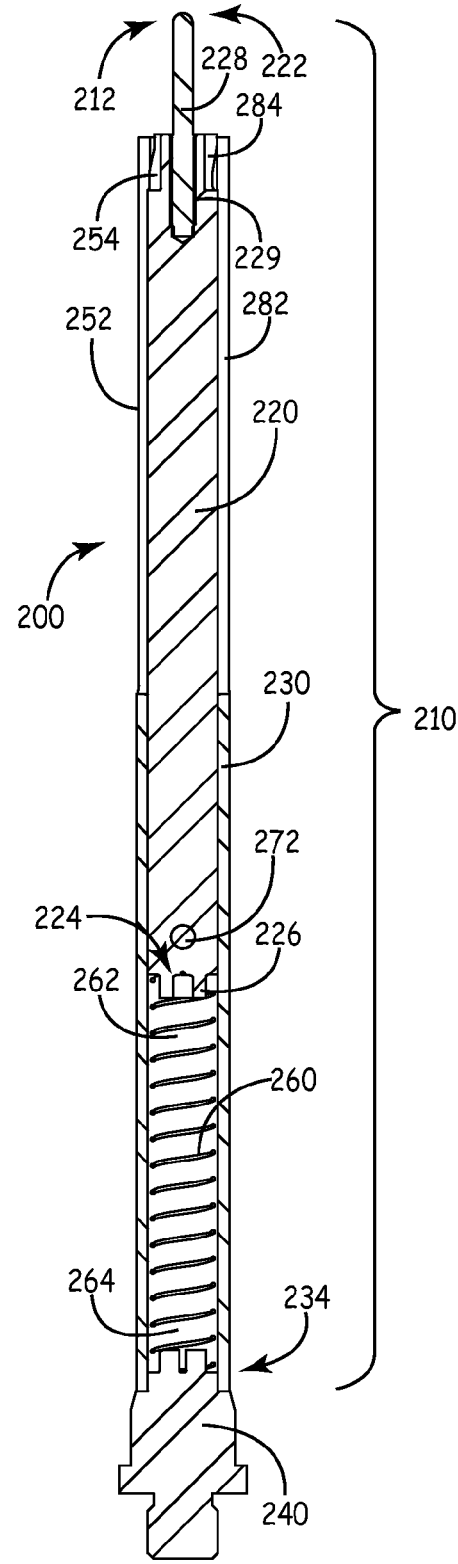
FIG. 3 depicts a cross sectional view of the interlock device depicted in FIG. 2.

The interlock device 200 can have a variety of configurations, and has a compression assembly 210 that is generally rigid in a locked and extended position. Upon engagement with a mating filter cartridge, the interlock device 200 is unlocked and able to shorten to a compressed position. FIG. 2 depicts a front view of an example interlock device consistent with the technology disclosed herein, and FIG. 3 depicts a cross sectional view of the interlock device depicted in FIG. 2. The interlock device 200 has a compression assembly 210 and a fitting 240, where the fitting 240 is coupled to the compression assembly 210. The fitting 240 is configured to connect to a filter receptacle consistent with the filter receptacle shown in FIG. 1.

The compression assembly 210 has a first device end 212 and a second device end 214, which could also be considered the first end and second end of the interlock device 200. In this embodiment, the fitting 240 is coupled to the second device end 214 of the compression assembly 210.

In the extended position of the compression assembly 210, the first device end 212 and second device end 214 of the compression assembly 210 are a first distance apart, and in the compressed position the first device end 212 and the second device end 214 of the compression assembly 210 are a relatively shorter, second distance apart.

The compression assembly 210 also has a locked position and an unlocked position. In the locked position, the first device end 212 and second device end 214 of the compression assembly 210 are rigid and are fixed distance apart, which is in the extended position. In the unlocked position, the first device end 212 of the compression assembly 210 is relatively translatable towards the second device end 214 of the compression assembly. In the unlocked position, the compression assembly can be in the extended position, the compressed position, or a position between the extended position and the compressed position. A spring 260 is compressively disposed between the first device end 212 and the second device end 214 of the compression assembly 210 such that, lacking opposing forces, the compression assembly 210 defaults to a locked position. In the current embodiment, a bayonet coupling 270 defines the locked position and the unlocked position of the compression assembly 210, which will be described in more detail, below.

In the current embodiment, the compression assembly 210 has a rod 220 having a first rod end 222 and a second rod end 224. At least a portion of a sleeve 230 is disposed over at least a portion of the rod 220, and the sleeve has a first sleeve end 232 and a second sleeve end 234. At least one of the rod and the sleeve is rotatable relative to the other of the rod and the sleeve. In the embodiments of FIGS. 2-3, it is the rod 220 that is configured to rotate in the sleeve 230. In some embodiments the sleeve 230 is configured to actively rotate about the rod 220.

The first rod end 222 is the first device end 212 of the compression assembly 210 (and the interlock device 200, itself) and the second sleeve end 234 is the second device end 214 of the compression assembly 210. The fitting 240 is the second end of the interlock device 200 and is coupled to the second sleeve end 234 of the sleeve 230. The spring 260 is compressively disposed between the fitting 240 and the rod 220, particularly, the second rod end 224. A variety of other configurations are anticipated, however.

The rod 220 and the sleeve 230 are releasably coupled with the bayonet coupling 270 mentioned above. As is known in the art, the bayonet coupling 270 can have a variety of configurations. In this particular configuration, the rod 220 has a bayonet pin 272 and the sleeve 230 defines the bayonet pin pathway 274. The bayonet pin 272 is coupled to the second end of the rod 220 and extends into the bayonet pin pathway 274. The bayonet pin pathway 274 extends from an intermediate location along the length of the sleeve 230 towards the second sleeve end 234.

The bayonet pin pathway 274 has a circumferential portion 276 and a longitudinal portion 278. In a locked position, the rod 220 is configured to rotate in the sleeve 230 to translate the bayonet pin 272 along the circumferential portion 276 of the bayonet pin pathway 274 to the longitudinal portion 278 of the bayonet pin pathway 274. As such, the compression assembly 210 is in its unlocked position when the bayonet pin is in the longitudinal portion 278 of the bayonet pin pathway 274, at which point the rod 220 is longitudinally translatable towards the second sleeve end 234 of the sleeve 230. In other words, when the compression assembly 210 is unlocked, the bayonet coupling 270 allows longitudinal translation between the first device end 212 of the compression assembly 210 and the second device end 214 of the compression assembly 210.

The bayonet coupling can have a variety of other configurations, as will be anticipated by those having skill in the art. For example, in one implementation a sleeve has a bayonet pin and a rod defines a bayonet pin pathway. In another embodiment, the sleeve and the rod have mutually interacting flanges that disengage upon relative rotation between the sleeve and the rod. Other embodiments are also possible.

As described above, to unlock the compression assembly 210, the sleeve 230 is rotated relative to the rod 220 to translate the bayonet pin 272 circumferentially to the longitudinal portion 278 of the bayonet pin pathway 274. In this embodiment, the rod 220 is rotated, while the sleeve is fixed. To accomplish this, a filter cartridge is installed in a filter receptacle assembly, such as that shown in FIG. 1. The installation of the filter cartridge operatively engages the compression assembly 210 to result in rotation of the rod 220.

While the filter cartridge configuration will be described in more detail herein, for purposes of the instant discussion it should be noted that the filter cartridge defines a first protrusion that is configured to engage a first key pathway 250 mutually defined by the rod 220 and the sleeve 230. In the current embodiment, the sleeve 230 defines a first sleeve pathway component 252 and the rod 220 defines a first rod pathway component 254. The first sleeve pathway component 252 is longitudinal and the first rod pathway component 254 is at least partially non-longitudinal, wherein non-longitudinal is defined as including a circumferential component. As an example, a non-longitudinal pathway wraps at least partially around the outer surface of the rod 220.

When the first protrusion engages the first key pathway 250, it extends through the first sleeve pathway component 252 and into the first rod pathway component 254. The protrusion translates longitudinally along the first sleeve pathway component 252, and also within the confines of the first rod pathway component 254. The longitudinal translation of the protrusion results in longitudinal forces being applied to the rod 220 from the first rod pathway component 254, which results in rotation of the rod 220. Generally, to achieve rotation of the sleeve 230 relative to the rod 220, at least a portion of the first key pathway 250 is non-longitudinal.

It at least one embodiment, a second key pathway (not visible in FIG. 2 or 3) is mutually defined by the rod 220 and the sleeve 230. The second key pathway is similar to the first key pathway 250, except defined at a different circumferential location. For example, the second key pathway can be located on the opposite side of the interlock device 200 than the first key pathway 250 in FIGS. 2 and 3.

Similar to the first key pathway 250, at least a portion of the second key pathway is non-longitudinal. The second key pathway is configured to receive a second protrusion from a filter cartridge. In a variety of embodiments, the second key pathway is configured to receive the second protrusion after the first key pathway 250 has already received the first protrusion. This can create a two-step unlocking process for the interlock device 200, which can allow for a greater variety of pin configurations to differentiate a greater variety of filter cartridges. As such, in some embodiments, the second key pathway is shorter than the first key pathway.

As mentioned above, the spring 260 is compressibly disposed between the first device end 212 and the second device end 214 of the compression assembly 210 such that the compression assembly 210 defaults to a locked position. As such, the spring 260 exerts a torsional force resisting rotation of the rod 220 in addition to an expansion force resisting compression of the compression assembly 210. In this embodiment, resisting compression of the compression assembly 210 is accomplished by resisting longitudinal, translation of the rod 220 towards the fitting 240.

In an example alternate configuration, a sleeve rotates over a rod. In such a configuration the rod is fixed, while the sleeve rotates resulting from forces from translation of the protrusion along the sleeve pathway component. In another example configuration, the sleeve pathway component is non-longitudinal and the rod pathway component is longitudinal. In yet another embodiment, both the sleeve pathway component and the rod pathway component have longitudinal and non-longitudinal portions. In embodiments where the sleeve rotates to unlock the interlock device, a fitting, as described above, can be coupled to the rod to fix the rod to the filter receptacle.

Interlock Device Components

The descriptions associated with FIGS. 4-8 will now describe components of the interlock device depicted in FIGS. 2 and 3 and, as such, FIGS. 2 and 3 can be referred to for further clarity of the descriptions.

Figure 4:
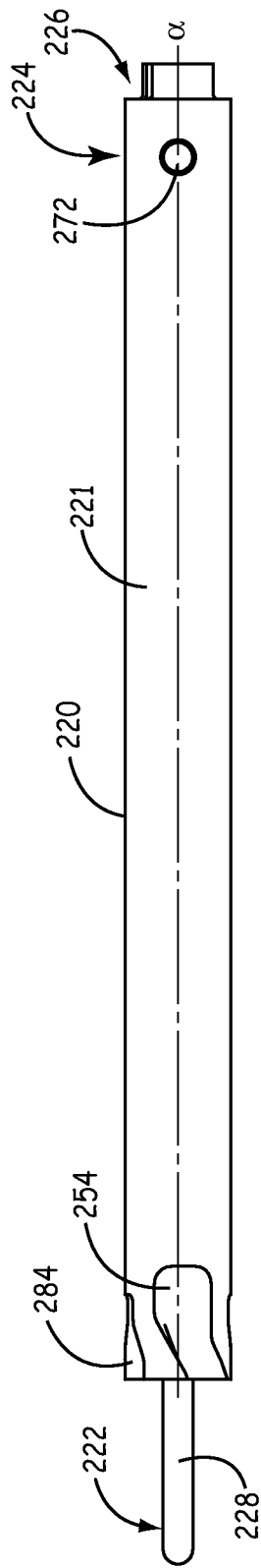
FIG. 4 is a perspective view of a rod of an interlock device.

FIG. 4 is front view of the rod 220 of the interlock device 200. The rod 220 has a first rod end 222 and a second rod end 224, a bayonet pin 272, a first rod pathway component 254 and a second rod pathway component 284.

The rod 220 is generally an elongate cylinder having a central axis a that is its axis of rotation. The rod 220 can be constructed of a variety of materials including metals, plastics, and so on. In one embodiment, the rod 220 is constructed of stainless steel. In another embodiment, the rod 220 is constructed of aluminum. In the current embodiment, the rod 220 is about 5.3 inches long, although those having skill in the art will appreciate that other lengths could be workable. It should be noted that sizes of all device components will be largely dependent on the size of the filtration system within which the device will be used. In some embodiments, the rod 220 has a length ranging from about 1.0 inch (2.54 cm) to about 24.0 inches (60.96 cm). Also, in the current embodiment, the rod 220 has a diameter of about 0.375 inches (0.95 cm). In some embodiments, the rod 220 can have a diameter ranging from about 0.1 inches (0.25 cm) to about 2.0 inches (5.08 cm).

The first rod end 222 of the rod 220 is a post 228 that extends along the axis of rotation a and provides additional length to the rod body 221. In the current embodiment the post 228 threadably engages an inner annular surface of the rod body 221 that defines a bore 229 (See FIG. 3). In another embodiment the post 228 frictionally engages the inner annular surface of the rod body 221 that defines the bore 229. It may be desirable to further secure the post 228 to the rod body 221 with an adhesive. In another embodiment, the post 228 and the rod body 221 are a single component. In yet another embodiment, the post 228 is welded to the rod body 221. Other embodiments are possible.

Generally, the post 228 has a smaller diameter than the rod body 221 to allow assembly and system components to accommodate the post 228. For example, a filter head or an engagement structure on the filter cartridge may not be able to accommodate the diameter of the rod body 221. However, the relatively small diameter of the post 228 is accommodated by the filter head and the filter cartridge. This is visible, for example, in FIGS. 14 and 16, which are described in detail, below. In the current embodiment, the post 228 has a diameter of about 0.11 inches (0.28 cm), while the threaded portion (not shown) has a diameter of 0.138 inches (0.35 cm).

The bayonet pin 272 is disposed towards the second rod end 224 of the rod 220. The bayonet pin 272 is substantially cylindrical in shape and extends radially from the rod 220. As described above, the bayonet pin 272 is configured to extend into the bayonet pin pathway 274 defined by the sleeve 230 (See FIG. 2). Similar to the post 228, described above, the bayonet pin 272 can be secured to the rod 220 through one of or a combination of a threading engagement, frictional engagement, welding and other connection methods. The bayonet pin 272 can alternatively be a cohesive portion of the rod 220. In the current embodiment, the bayonet pin 272 has a length of 0.3 inches (0.76 cm) and a diameter of 0.12 inches (0.30 cm).

The rod 220 defines a first rod pathway component 254 and a second rod pathway component 284. In the current embodiment, both the first rod pathway component 254 and a second rod pathway component 284 are configured to receive an engagement structure of a filter cartridge. The engagement structure generally is a first protrusion and a second protrusion. The first rod pathway component 254 and the second rod pathway component 284 are configured to elicit rotation of the rod 220 relative to the sleeve 230 (see FIGS. 2 and 3), or the sleeve 230 relative to the rod 220, upon longitudinal translation of the filter cartridge and, therefore, the filter engagement structure. The first rod pathway component 254 is configured to elicit partial rotation of the sleeve 230 or the rod 220 upon receiving a first portion of the engagement structure of the filter cartridge which, in turn, elicits engagement of a second portion of the engagement structure of the filter cartridge with the second rod pathway component 284. As mentioned above, the first portion of the engagement structure of the filter cartridge can be a first protrusion and the second portion of the engagement structure can be a second protrusion.

In one embodiment, the first rod pathway component 254 and the second rod pathway component 284 is defined by machining the surface of the rod 220, although other approaches can be used to define them. Both the first rod pathway component 254 and the second rod pathway component 284 are at least partially non-longitudinal in the current embodiment, which results in the rotation of the rod 220 relative to the sleeve 230 or the sleeve 230 relative to the rod 220. In one embodiment, including the one depicted herein, a third rod pathway component equivalent to the first rod pathway component is defined on the opposite circumferential side of the rod. Likewise, a fourth rod pathway component equivalent to the second rod pathway component is defined on the opposite circumferential side of the rod.

The second rod end 224 defines a spring connector 226 that is configured to receive the spring 260 (see FIG. 3). The spring connector 226 has a smaller diameter than that of the rod body 221 to accommodate the width of the spring between the sleeve and the spring connector 226. As is visible in FIG. 3, the spring connector 226 can define additional openings to enable engagement with the spring 260. In other embodiments other structures can be defined on the second end of the rod 220 to receive the spring 260. The diameter of the spring connector 226 is about 0.25 inches (0.63 cm) in the current embodiment.

Figure 5:
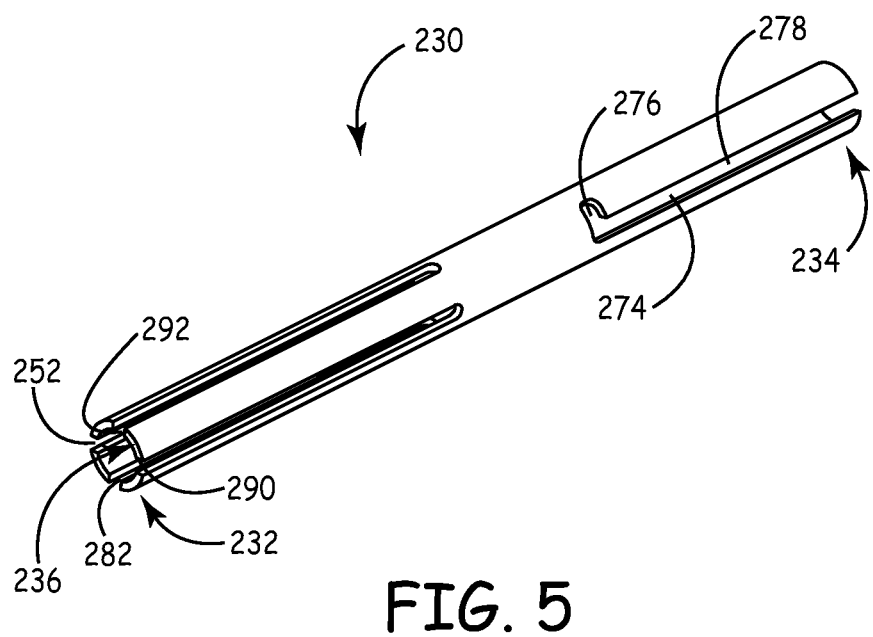
FIG. 5 is a perspective view of a sleeve of an interlock device.

FIG. 5 is a perspective view of a sleeve of an interlock device, such as the interlock device depicted in FIGS. 2 and 3. The sleeve 230 defines first and second sleeve pathway components 252, 282, and a mating bayonet connector for the rod that is a bayonet pin pathway 274. The sleeve 230 is generally a hollow elongate cylinder in shape and has first sleeve end 232 and a second sleeve end 234. In the current embodiment, the sleeve is about 6.75 inches (17.14 cm) long, has an inner diameter of about 0.38 inches (0.96 cm) and an outer diameter of about 0.5 inches (1.27 cm). Generally the length of the sleeve can range from about 1.0 inches (2.54 cm) to about 24.0 inches (60.96 cm).

The sleeve 230 defines a first sleeve pathway component 252 and a second sleeve pathway component 282. In the current embodiment, both the first sleeve pathway component 252 and a second sleeve pathway component 282 are configured to receive an engagement structure of a filter cartridge. The engagement structure generally is a first protrusion and a second protrusion. The first sleeve pathway component 252 and the second sleeve pathway component 282 are configured to limit translation of the filter cartridge to a longitudinal direction.

As described above, the first sleeve pathway component 252 and the first rod pathway component 254 form the first key pathway 250 (See FIG. 2). Likewise, the second sleeve pathway component 282 and the second rod pathway component 284 form the second key pathway. The first key pathway and the second key pathway are configured to elicit rotation of the rod 220 relative to the sleeve 230, or the sleeve 230 relative to the rod 220 upon engagement of the engagement structure of the filter cartridge with the first and second key pathways.

The first key pathway 250 is configured to elicit partial rotation of the sleeve 230 or the rod 220 upon receiving a first portion of the engagement structure of the filter cartridge which, in turn, elicits engagement of a second portion of the engagement structure of the filter cartridge with the second key pathway. As such, unlocking the interlock device can be considered a two-step process.

In one embodiment, the first sleeve pathway component 252 and the second sleeve pathway component 282 are defined by machining the sleeve 230, although other approaches can be used to define such pathways. In one embodiment, including the one depicted herein, a third sleeve pathway component 290 equivalent to the first sleeve pathway component is defined on the opposite circumferential side of the sleeve. Likewise, a fourth sleeve pathway component 292 equivalent to the second sleeve pathway component is defined on the opposite circumferential side of the sleeve.

The second sleeve end 234 defines a bayonet pin pathway 274 that is configured to receive the bayonet pin 272 (See FIG. 4) on the rod 220. The bayonet pin pathway 274 is machined into the sleeve and, in the current embodiment is about 0.16 inches (0.41 cm) wide. The bayonet pin pathway 274 has a circumferential portion 276 and a longitudinal portion 278. As described above, the bayonet coupling between the rod 220 and the sleeve 230 defines the locked position and the unlocked position of the compression assembly 210 (See FIGS. 2 and 3). In the unlocked position, the bayonet pin 272 of the rod is in the longitudinal portion 278, so that the bayonet pin 272 and, therefore, the rod and the filter cartridge, are able to translate longitudinally. In the locked position, the bayonet pin 272 is not in the longitudinal portion 278, so that the pin and, therefore, the rod, is not able to translate longitudinally but is able to rotate along the circumferential portion 276.

Figure 6:
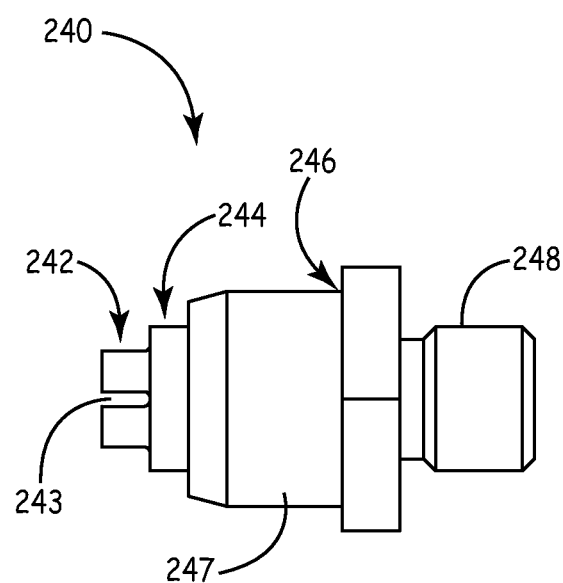
FIG. 6 is a front view of a fitting of an interlock device.

FIG. 6 is a front view of a fitting of the interlock device depicted in FIGS. 2 and 3. The fitting 240 is generally configured to couple the compression assembly 210 to a filter receptacle 100 (See FIGS. 1A and 1B), such as a filter bowl. Those having skill in the art will appreciate that coupling the compression assembly to the filter receptacle can be accomplished in a number of ways. In this particular embodiment, the fitting 240 defines a receptacle connector 248, an interlock connector 244, a filter connector 246, and a spring connector 242.

The receptacle connector 248 is configured to connect to the filter receptacle 100, such as in FIGS. 1A and 1B. In one embodiment, the receptacle connector 248 has an outer annular surface that is threaded to the end surface of the filter receptacle. In another embodiment, the receptacle connector 248 is coupled to the end surface of the filter receptacle through other coupling methods such as welding, adhesive use, and so on. In the current embodiment the receptacle connector 248 is threaded and has a diameter of about 0.37 inches (0.94 cm).

The interlock connector 244 is configured to couple to the compression assembly 210 (See FIGS. 2 and 3). In the embodiment depicted herein, the interlock connector 244 is disposed on the second compression assembly end, which is the second sleeve end 234. The interlock connector 244 defines an outer annular surface that receives the inner annular surface of the second end of the sleeve 230. In one embodiment, the fitting is welded to the sleeve 230. Those having skill in the art will appreciate other approaches that can be used to couple the fitting and the interlock device 200.

The interlock connector 244 additionally has a spring connector 242 that is configured to receive the second spring end 264 of the spring 260. The spring connector 242 defines an annular surface and includes one or more notches 243. The spring connector 242 can frictionally engage the second spring end 264 of the spring, or other approaches can be used. The spring connector 242, with the second rod end 224 (see FIG. 4), is configured to keep the spring in torsional and lateral compression.

The interlock connector also defines a filter connector 246 that is configured to receive the filter cartridge 300. The filter connector 246 has an annular surface that is configured to frictionally engage an end cap of the filter cartridge. In one embodiment, an o-ring seal is disposed around the annular surface 247 to relatively increase frictional forces between the fitting 240 and the filter cartridge end cap. Such an o-ring seal can also help prevent leakage between the upstream and downstream sides of the filter cartridge through the annular space between the interlock device and the filter cartridge. In a variety of embodiments, the frictional forces between the filter cartridge 300 and the fitting 240 overcome the expansion force of the spring 260 such that upon frictional engagement of the filter cartridge 300 and the fitting 240, the filter cartridge 300 stays in place. As such, the diameter of the annular surface 247 is sized to receive the filter cartridge opening and frictionally engage the filter cartridge. In the current embodiment, the diameter of the annular surface 247 is about 0.56 inches (1.42 cm).

Figure 7:
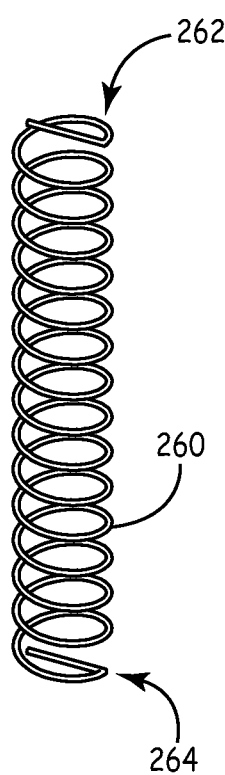
FIG. 7 is a perspective view of a spring consistent with the technology disclosed herein.

FIG. 7 is a perspective view of a spring consistent with the technology disclosed herein. As described above, the spring 260 is compressively disposed between the first device end 212 and the second device end 214 of the compression assembly 210 such that, lacking a opposing forces, the compression assembly 210 defaults to a locked position. As such, in the embodiment disclosed herein, the spring is configured to exert a torsional and lateral load to the first device end 212 and second device end 214 of the compression assembly 210.

The spring 260 has a first spring end 262 and a second spring end 264, wherein the spring is disposed in the second sleeve end 234 and the first spring end 262 is coupled to the second rod end 224 and the second spring end 264 is coupled to the fitting 240. In the current embodiment, the spring 260 has an outer diameter of 0.34 inches (0.86 cm). In the present embodiment, the spring is constructed of heat treated steel, although other materials are contemplated, as well.

Figure 8:
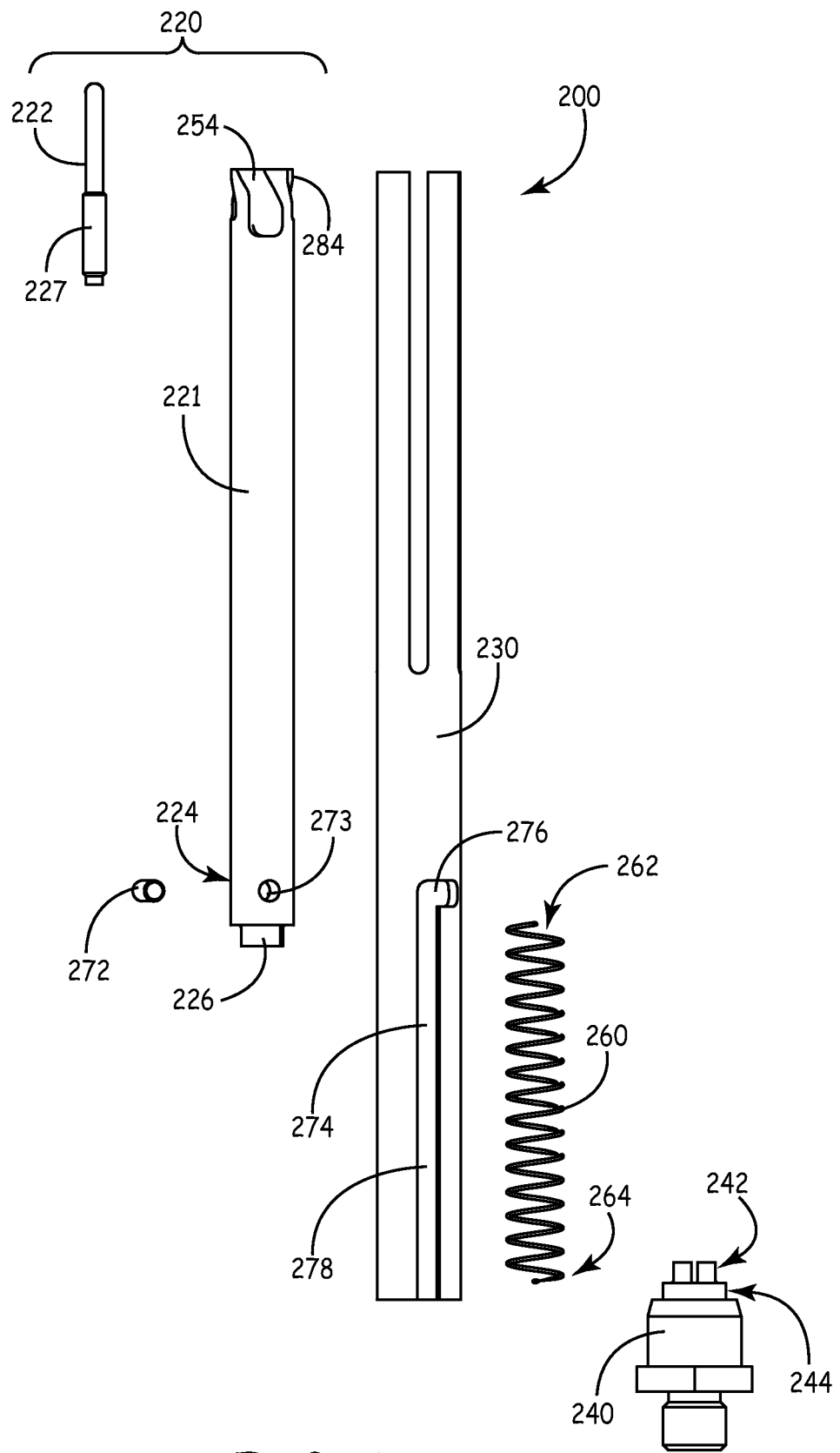
FIG. 8 is a front view of the disassembled interlock device of FIG. 2.

FIG. 8 is a front view of the disassembled interlock device of FIG. 2. In an example assembly method, the bayonet pin 272 is welded to a bayonet pin receptacle 273 defined by the rod 220. The first rod end 222, which is the post 228 having a threaded portion 227 is coupled to the rod body 221 where a bore 229 is defined (visible in FIG. 3). The rod 220 is inserted in the sleeve 230 such that the bayonet pin 272 is disposed in the bayonet pin pathway 274 defined by the sleeve 230. The first spring end 262 is coupled to the spring connector 226 on the second spring end 264 and the second spring end 264 is coupled to the spring connector 242 defined by the fitting 240. The interlock connector 244 of the fitting 240 is coupled to the sleeve 230 and then the fitting 240 and the sleeve 230 are welded together. Other methods of assembly are anticipated as well.

Figure 9:
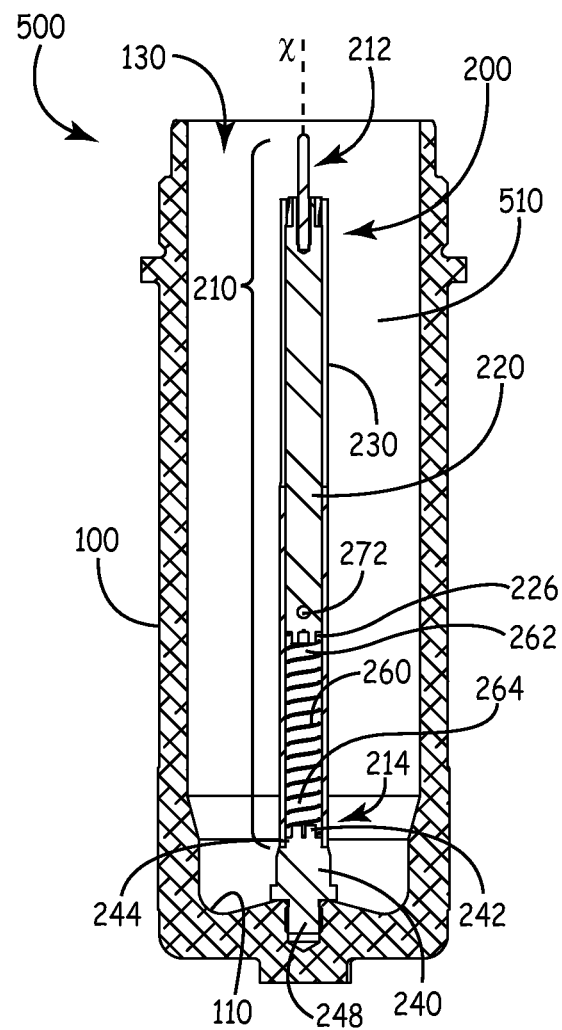
FIG. 9 depicts a cross sectional view of a filter receptacle assembly consistent with the technology disclosed herein.

FIG. 9 depicts a cross sectional view of a filter receptacle assembly consistent with the technology disclosed herein. The filter receptacle assembly 500 is generally a filter receptacle 100 having a compression assembly 210 attached thereto with a fitting 240.

In multiple embodiments the interlock device 200 is aligned with a central axis x of the filter receptacle 100. The fitting 240 is coupled to the end surface of the filter receptacle and the second device end 214 of the compression assembly 210, while the first device end 212 of the compression assembly 210 is adjacent to the opening 130 defined by the filter receptacle 100. The receptacle connector 248 of the fitting 240 threadably engages the receptacle end surface 110.

The filter receptacle assembly 500 defines a filter opening 510 between the inner annular surface 120 of the filter receptacle 100 and the outer surface of the interlock device 200. The filter opening 510 is configured to receive a filter cartridge, such as that depicted in FIGS. 1A and 1B, and which will be further described, below.

Filter Cartridge Configuration

Figure 10:
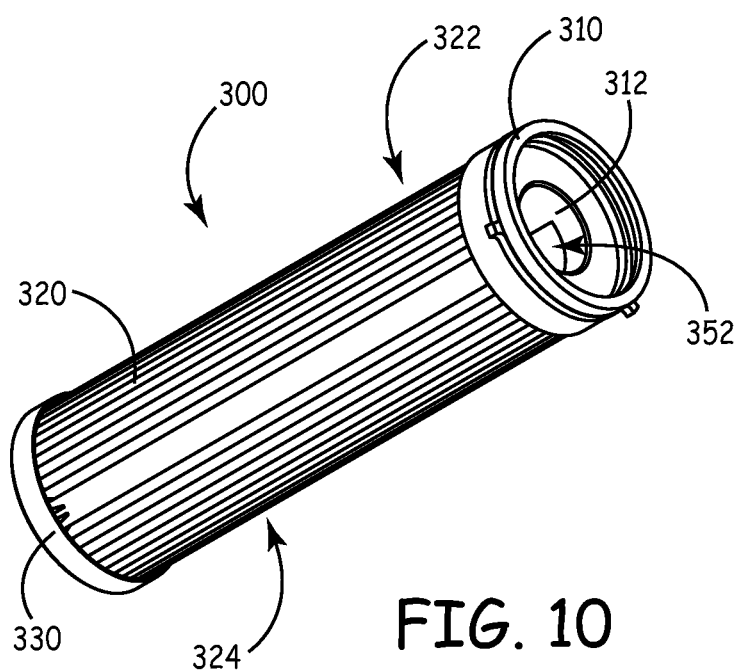
FIG. 10 depicts a perspective view of an example filter cartridge.
Figure 11:
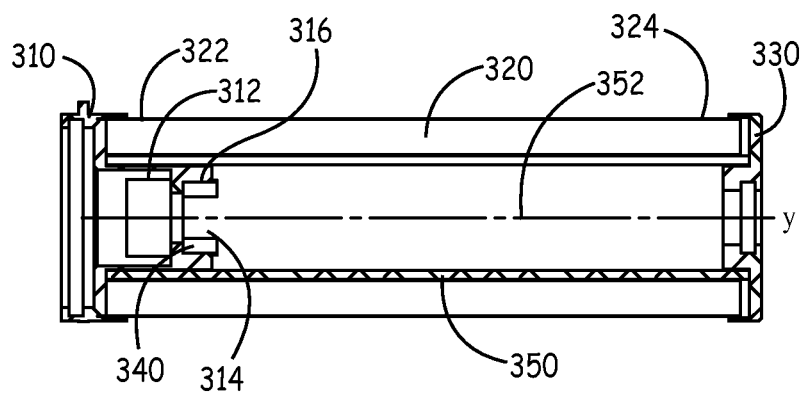
FIG. 11 depicts a cross-sectional view of the example filter cartridge of FIG. 10.

FIG. 10 depicts a perspective view of an example filter cartridge, and FIG. 11 depicts a cross-sectional view of the filter cartridge of FIG. 10. The filter cartridge 300 is generally tubular in shape, having a tubular construction of filter media 320 with a first media end 322 and a second media end 324. The first media end 322 is coupled to a first end cap 310 and the second media end 324 is coupled to the second end cap 330. The filter cartridge generally defines an open filter interior 352 there-through.

The filter media 320 can be virtually any type of filter media known in the art, and will generally be filter media associated with fluid filtration including air, liquids, and gases. The filter media 320 can be corrugated, non-corrugated, granular, fiberglass, paper, wire mesh, synthetic, cellulosic, fibrous, and/or combinations thereof. The filter media 320 generally has a central axis y that is substantially aligned with the central axis x of the filter receptacle assembly 500 (see FIG. 9, for example).

The filter cartridge 300 is configured to be installed in a filter receptacle assembly 500, such as that depicted in FIG. 9. The filter cartridge 300 defines an engagement structure that unlocks the interlock device 200 of the filter receptacle assembly 500. In the current embodiment, it is the first end cap 310 that defines the engagement structure that will be referred to as a key 340. The key 340 is coupled to the extension portion 312 of the first end cap 310. The extension portion 312 of the first end cap 310 projects toward the second end cap 330 into the open filter interior 352 defined by the filter media 320.

Figure 12:
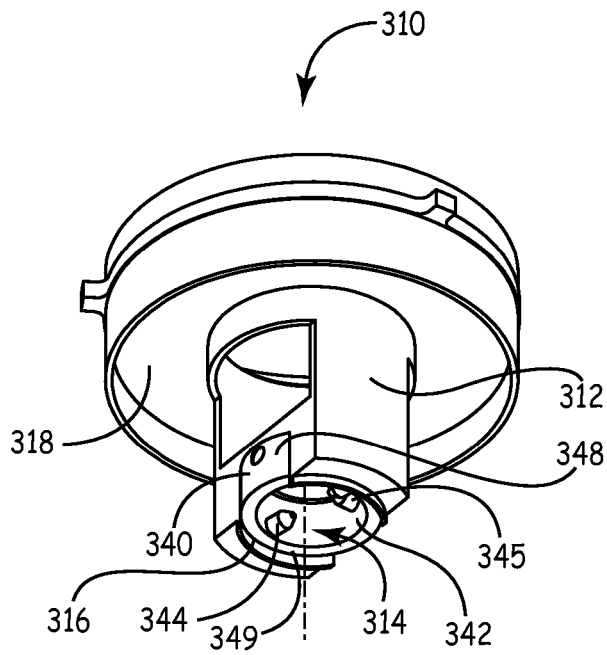
FIG. 12 depicts a perspective view of an end cap assembly, consistent with the technology disclosed herein.
Figure 13:
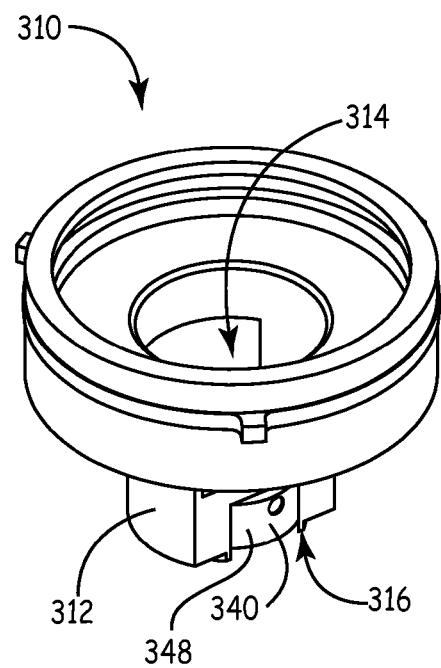
FIG. 13 depicts a different perspective view of the end cap assembly, consistent with the technology disclosed herein.

The key 340 of the first end cap 310 is configured to engage the filter receptacle assembly to unlock the interlock device and allow installation of the filter cartridge 300. FIG. 12 depicts a perspective view of a first end cap, consistent with the technology disclosed herein. FIG. 13 depicts a different perspective view of the first end cap assembly, consistent with the technology disclosed herein.

The first end cap 310 is configured to be coupled to a first end of filter media 320 of a filter cartridge 300 at a connection surface 318. An extension portion 312 extends substantially perpendicularly from the connection surface 318 and is configured to extend into the open filter interior 352 (See FIG. 11) defined by the filter media 320. In one embodiment the extension portion 312 extends about 1.1 inches (2.8 cm) from the connection surface 318. The distal end of the extension portion 312 defines a key receptacle 316 that is configured to receive a key 340. In the current embodiment, the key receptacle 316 is a non-continuous inner annular surface.

The key 340 is a cylindrical ring having an inner annular surface 342, a distal end 349, and an outer annular surface 348 that is adjacent to the annular surface defined by the key receptacle 316. The key 340 is rotatable with respect to the first end cap 310. The first end cap 310 and the key 340 mutually define a central opening 314 that is in communication with the media open filter interior 352. In the current embodiment, the key 340 is about 0.280 inches (0.71 cm) in a longitudinal direction, has an outer diameter of about 0.74 inches (1.88 cm), and an inner diameter of about 0.58 inches (1.47 cm).

A first protrusion 344 and a second protrusion 345 are disposed on the inner annular surface 342 and protrude into the central opening 314. The first protrusion 344 and second protrusion 345 are configured to unlock an interlock device. As described above, the first protrusion 344 is configured to engage a first key pathway defined by the interlock device and the second protrusion 345 is configured to engage a second key pathway defined by the interlock device. As such, the central opening 314 is configured to receive the first end of an interlock device. Although only two protrusions are visible in the current views, FIG. 14 reveals that there are four protrusions, all of which are configured to mutually engage an interlock device as described with respect to the first protrusion and second protrusion, above.

Figure 14:
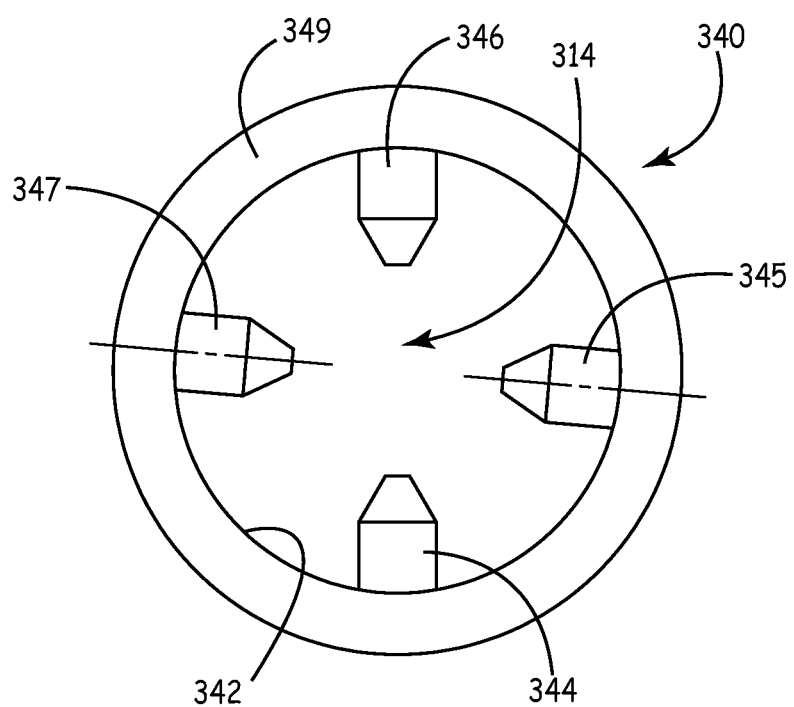
FIG. 14 depicts a view of a key, consistent with the technology disclosed herein.

FIG. 14 depicts a view of a key from the distal end, consistent with the key depicted in FIGS. 12 and 13. The key 340 has an inner annular surface 342 having protrusions 344, 345, 346, 347 extending into the central opening 314 defined therein. A first protrusion 344 is radially spaced from a second protrusion 345, a third protrusion 346, and a fourth protrusion 347. In the current embodiment, the first protrusion 344 and second protrusion 345 are about 85 degrees apart. The first protrusion 344 and the fourth protrusion 347 are about 95 degrees apart. The first protrusion 344 and the third protrusion 346 are 180 degrees apart. The second protrusion 345 and the fourth protrusion 347 are 180 degrees apart, as well. The radial spacing of the protrusions can vary. In some embodiments one protrusion is close to 90 degrees, although not quite 90 degrees, from one or more adjacent protrusions.

Although it is not visible in the FIG. 14, it is visible in FIG. 12 that the first protrusion 344 is a shorter distance from the distal end 349 of the key 340 relative to the distance between the second protrusion 345 and the distal end 349 of the key 340. Although not visible, in the current embodiment the second protrusion 345 and the fourth protrusion 347 are substantially equidistant from the distal end 349 of the key 340. Likewise, the first protrusion 344 and the fourth protrusion 347 are substantially equidistant from the distal end 349 of the key 340. In the current embodiment, the first protrusion 344 and the third protrusion 346 are about 0.067 inches (0.17 cm) from the distal end 349 of the key 340 and the second protrusion 345 and the fourth protrusion 347 are about 0.213 inches (0.54 cm) from the distal end 349 of the key.

The differences among the protrusions with regard to each of their longitudinal positions along the inner annular surface of the key can essentially create a multi-step unlocking process for the interlock device. As mentioned above with respect to the discussion of the key pathways of the interlock device, the current embodiment has a two-step unlocking system. The first step associated with unlocking the interlock device is the entrance of the first protrusion in the first key pathway. The second step associated with unlocking the interlock device is the entrance of the second protrusion in the second key pathway.

In some embodiments each protrusion can have a different distance from the distal end of the key, while in other embodiments at least one protrusion will have a distance from the distal end of the key that is substantially similar to the distance from another protrusion to the distal end of the key.

As has been described, the key having the protrusions defines an engagement structure configured to unlock an interlock device. The protrusions are configured to engage corresponding key pathways defined by the interlock device and translate along the key pathways, which unlocks the interlock device. As such, the key is configured to correspond with the structure of the interlock device. Although in the current embodiment there are four protrusions, in some embodiments there may be two protrusions, three protrusions, or five protrusions. In a variety of embodiments the key has two or more protrusions. The number of protrusions on the key can depend on the number of key pathways defined by a corresponding interlock device, or, the number of key pathways defined by an interlock device can depend on the number of protrusions on the key. Those having skill in the art will understand the innumerable configurations of the engagement structure of the filter cartridge and the corresponding structure of the interlock device.

In the current embodiment the protrusions are substantially similar in size and structure, although it is anticipated that one protrusion could have a different size and/or structure than one or more other protrusions. In this embodiment the length of the protrusions are about 0.22 inches (0.56 cm) and the diameter is about 0.10 inches (0.25 inches). The protrusions are generally tapered so as to more easily be received by corresponding key pathways. In at least one embodiment the key is formed by drilling discrete holes from the outer annular surface of the key to the inner annular surface of the key in the desired locations of the protrusions. The protrusions can be inserted in their respective holes and welded thereto.

Figure 17:
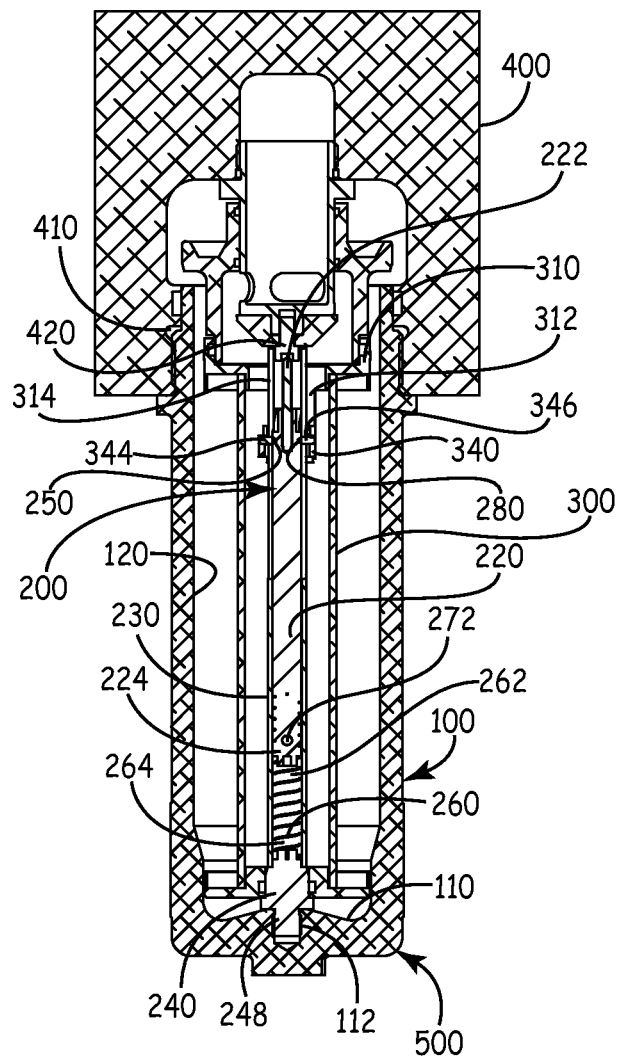
FIG. 17 depicts a cross-sectional view of the example implementation of FIG. 1, after filter installation.

FIGS. 15-17 depict cross sectional views of a filter cartridge coupled to an interlock device, consistent with the technology disclosed herein. Particularly, FIG. 15 depicts a filter cartridge coupled to an unlocked interlock device, FIG. 16 depicts the filter receptacle assembly coupled to the filter cartridge before installation to a filter head, and FIG. 17 depicts the filter receptacle assembly coupled to the filter cartridge, after filter installation where they are coupled to the filter head.

The filter head 400 will generally be consistent with what is known in the art and defines a bowl receptacle 410 configured to receive the filter receptacle 100. The filter head 400 can also include a rod receptacle 420 configured to receive the first rod end 222 of the interlock device 200, in at least one embodiment.

In FIGS. 14, 15, and 16 an interlock device is substantially accommodated by a central opening 314 defined by a filter cartridge 300. A key 340 having a first protrusion 344 and a second protrusion 345 engages the interlock device 200 in a first key pathway 250 and a second key pathway 280, respectively. A fitting 240 defining a filter connector 246 surface frictionally engages a second end cap 330 of the filter cartridge 300. The second end cap can define a cavity 332 that is configured to receive an O-ring to help seal the connection between the interlock device 200 and the filter cartridge 300.

As mentioned in the discussion associated with FIGS. 1a and 1b, above, installation of the filter cartridge 300 in the filter receptacle assembly 500 unlocks the interlock device 200 and compresses the compression assembly 210 from a first, extended position to a second, compressed position. In the embodiments depicted in FIGS. 16 and 17, upon unlocking the interlock device 200, the compression assembly 210 can be manually compressed such that the first device end 212 of the compression assembly 210 is displaced towards the second device end 214 of the compression assembly 210.

When the key protrusions engage their respective key pathways of the interlock device, the interlock device unlocks as the key protrusions are translated along the non-longitudinal component of the respective key pathways, which, in this embodiment are defined by the rod. The translation of the key protrusions along the respective non-longitudinal components of the key pathways and the associated straight components of the key pathways (defined by the sleeve) results in rotation of the rod relative to the sleeve, which unlocks the bayonet coupling. As the filter cartridge is installed in the filter receptacle by providing a manual, lateral force directing the filter cartridge in the filter receptacle, the key protrusions reach the end of the non-longitudinal key pathways, and the lateral force is translated from the key protrusions to the rod itself. As such, the rod is translated laterally with the filter cartridge along the longitudinal key pathway as the filter cartridge is installed in the filter receptacle.

FIG. 9 depicts the interlock device 200 in an extended, locked position, which can be compared to FIGS. 15-17, for example, where the filter cartridge 300 is installed in the filter receptacle assembly 500 so as to unlock the interlock device 200, and the first device end 212 of the compression assembly 210 has been manually compressed towards the second device end 214 of the compression assembly 210 as the filter cartridge 300 is translated to the inside of the filter receptacle 100. As such, the first rod end 222 is within a sleeve opening 236 defined by the sleeve 230 on the first sleeve end 232.

Upon manual compression of the interlock device 200 the device is engaged to remain in the compressed position. In the current embodiment, the annular surface 247 of the spring connector 242 defined by the fitting 240 is configured to frictionally engage the second end cap 330 of the filter cartridge 300 when the spring 260 is compressed in response to translation of the first device end 212 towards the second device end 214, defining the compressed position of the interlock device 200.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the current technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

I claim:

1. A filter cartridge comprising:
   a first end cap having an extension portion;
   a tubular construction of filter media defining a cylindrical open filter interior having:
   a first end coupled to the first end cap and
   a second end;
   a second end cap coupled to the second end of the filter media;
   a key coupled to the extension portion of the first end cap, wherein the key is configured to engage a filter receptacle assembly, wherein the key is rotatable with respect to the extension portion, and wherein the key is disposed within the cylindrical open filter interior defined by the filter media; and
   wherein the extension portion of the first end cap projects toward the second end cap and into the cylindrical open filter interior defined by the filter media.

2. The filter cartridge of claim 1 wherein the key is cylindrical, defines an inner annular surface, and defines one or more protrusions extending from the inner annular surface.

3. The filter cartridge of claim 2, wherein the key defines two or more protrusions extending from the inner annular surface.

4. The filter cartridge of claim 3, wherein the key defines a distal end and at least two of the two or more protrusions are different distances from the distal end of the key.

5. The filter cartridge of claim 3, wherein at least two of the two or more protrusions are less than 90 degrees apart radially along the inner annular surface.

6. The filter cartridge of claim 1, wherein the extension portion has a distal end defining a key receptacle in receipt of the key.

7. The filter cartridge of claim 6, wherein the key receptacle defines a non-continuous inner annular surface.

* * * * *